April 14, 1964 W. B. KILGORE 3,128,807
FAIL SAFE VALVE FOR TIRE CHUCK ON POST-INFLATION MACHINE
Filed July 15, 1960 3 Sheets-Sheet 1

INVENTOR.
Woodson B. Kilgore
BY
Wilson, Settle, McRae
& Craig
ATTORNEYS

INVENTOR.
Woodson B. Kilgore
BY
Wilson, Settle, McRae & Craig
ATTORNEYS

April 14, 1964   W. B. KILGORE   3,128,807
FAIL SAFE VALVE FOR TIRE CHUCK ON POST-INFLATION MACHINE
Filed July 15, 1960   3 Sheets-Sheet 3

INVENTOR.
Woodson B. Kilgore
BY
Wilson, Settle, McRae
& Craig
ATTORNEYS

United States Patent Office 3,128,807
Patented Apr. 14, 1964

3,128,807
FAIL SAFE VALVE FOR TIRE CHUCK
ON POST-INFLATION MACHINE
Woodson B. Kilgore, Livonia, Mich., assignor to Firwood
Manufacturing Company, Dearborn, Mich., a corporation of Michigan
Filed July 15, 1960, Ser. No. 43,027
10 Claims. (Cl. 144—288)

This invention relates to tire inflation devices, that is to supports for inflating a tire and holding it inflated for various purposes one of which might be the post-inflation of tires for stretching and cooling after the tires have been removed from the molding machine.

It has been proposed to hold a tire inflated in a tire chuck which has two separate members or halves each of which has a flanged ring for supporting one bead of a tire so that the chuck when assembled holds and inflates the tire as if it were on a standard vehicle wheel. Such chucks that have come to my attention operate satisfactorily within their inherent limitations but they have various disadvantages.

In some instances the locking means which holds the chuck members or chuck halves together has not been positive or certain and these have let the chuck come apart when there was pressure in the tire. This can cause serious accidents.

In some instances it has been possible to begin inflating the tire before the locking means was in correct or fully locked position. This has caused the locking means to fail and has resulted in accidents.

In some instances in which attempts have been made to coordinate the locking devices with the inflating control, the combination has been complicated, awkward, unreliable or expensive or even all of these.

One of the objects of this invention is to provide an improved lock for tire chucks which is simple, reliable and positive in operation, yet economical to make.

Another object is to provide a simple and reliable control for inflating and deflating or venting the tire, more specifically by providing an air pressure inlet which continuously communicates with the tire together with a vent passage which either can be connected to the tire (or to the inlet) to prevent inflation of the tire, or can be blocked to permit inflation.

Still another object is to combine the inflating and deflating means with an operator for the locking means so that it is impossible to supply air pressure to the tire even if normal controls are operated to supply air, unless the locks are in positive locking position.

It is also an object to provide means which prevents moving of the locks to unlocking position until the tire is completely deflated or vented, that is until it is apparent or gauge pressure is very low, or substantially zero.

Another object is to provide an improved method of, and apparatus for, straightening warped beads of partially cured tires which have been removed from the molds and holding the beads straight until the curing is finished and the tire cooled. More specifically this is accomplished by pressing the tire beads firmly into contact with each other before inflating the tire, in order both to straighten the beads and to form an initial seal between the beads and the tire rings.

Other objects of this invention will appear in the following description and appended claims, reference being had to the accompanying drawings forming a part of this specification wherein like reference characters designate corresponding parts in the several views.

Before explaining the present invention in detail, it is to be understood that the invention is not limited in the application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
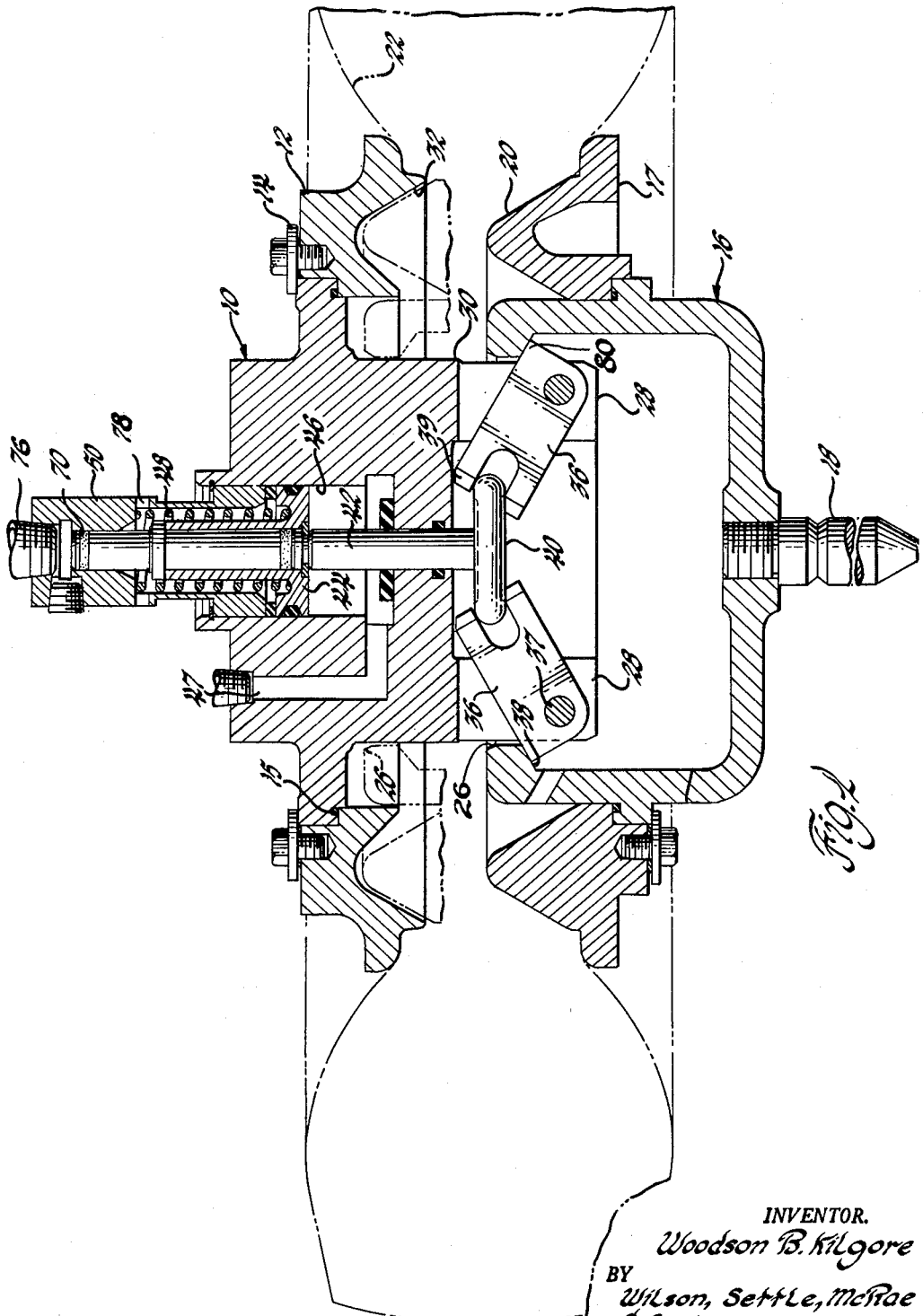
FIG. 1 is a vertical section through an inflated tire supported on a chuck in locked position.

Referring to FIG. 1 a tire chuck is formed collectively by two separable chuck halves or chuck members. The upper member includes a principal body 10 which may be fixed as known in the art, and a removable interchangeable tire ring 12 secured to it by clamps 14 and a pressure tight seal such as an O-ring 15 to provide for different sizes of tires. The lower half or member is movable with respect to the upper half end includes a principal body 16 and a tire ring 17 similarly secured and sealed. The halves together constitute a support which holds the tire for inflation like a vehicle wheel. The lower chuck body is raised and lowered by any suitable means such as a machine which successively grips a stud 18, raises the stud to position the chuck halves together and releases the stud. As the lower half 16—17 is being raised, a male conical guide 20 on ring 17 centers a tire 22 and the ring 17 supports the tire. As the tire is lifted towards the position in which it is clamped between the two rings, the surface 26 of the lower body 16 is piloted on a circular group of lock supports 28 formed integral with a central boss 30 of the upper body 10. As the lower body is further raised the conical guide 20 is accurately centered by a female conical guide surface 32 of the upper ring 12 so that the tire beads are supported and flattened against each other to straighten any warped beads and to form an initial seal between the outside of each bead and the ring 12 or 17. When this occurs the male guide ring 20 may be bottomed in the female guide 32 or nearly so and the surface 26 is in the position shown in the dotted lines in FIG. 1.

The spaces between adjacent lock supports 28 form recesses for receiving locking dogs 36 each pivoted on a pin 37 secured in two adjacent supports 28. When the body 16 is being raised the dogs are in the position shown in FIG. 2, but after it has been raised enough, for example when the beads are pressed together as described above, the dogs are moved into their locking position shown in FIG. 1. Then, and only then, inflation of the tire is begun. This pushes the lower chuck half down against the locked dogs and into the position shown in FIG. 1, the shoulder 38 being positively held against further movement by the dogs and being thus positively locked. Force tending to separate the chuck halves urges the dogs 36 to rotate about their pivots but further rotation is prevented by the tails 39 of the dogs which are positively held by the boss 30 against further rotation.

The dogs are moved into locked and unlocked position and are held in either position by circular member 40 secured to the end of a hollow locking rod or plunger 42 attached to a piston 44 in a cylinder 46 in the body 10 which forms a motor for raising the piston by pressure of air against the force of an unlocking spring 48 confined between the piston and a stationary bonnet 50 secured to the body 10.

When air under pressure is admitted to the passage 47 the piston 44 and rod 42 rise to move the dogs to locking position shown in FIG. 1. When the passage 47 and cylinder 46 are vented the spring 48 pushes the piston and rod assembly down to move the dogs to the unlocked position shown in FIG. 2, provided this is permitted by the pressure in the tire.

Figure 2:
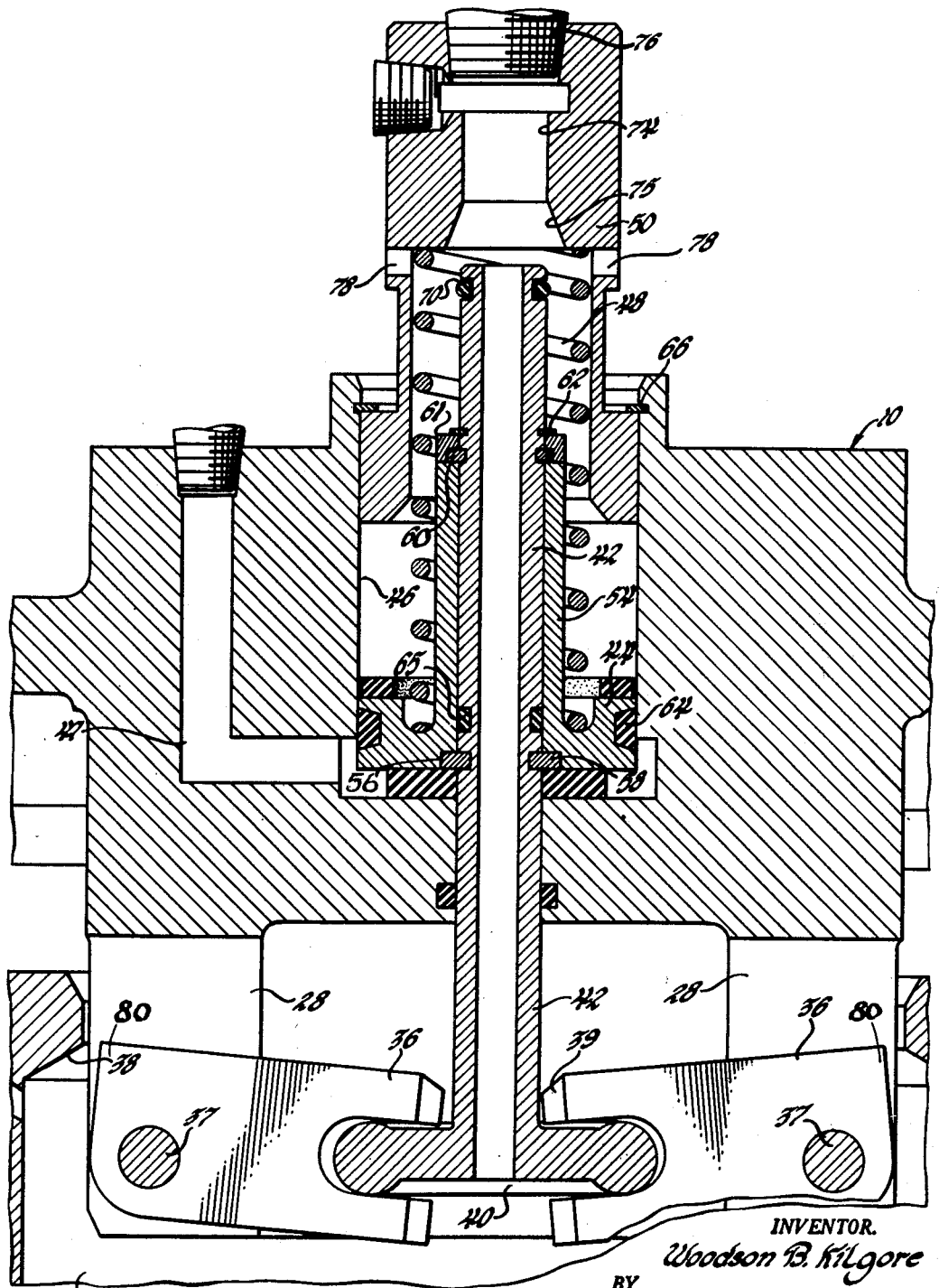
FIG. 2 is an enlarged vertical section through the inflating and locking mechanism showing the locks in their unlocked position, in which they must be after the tire has been deflated and before it can be removed from the chuck.

One way of securing the above described parts together is shown best in the enlarged FIG. 2. The piston 44 has a central hollow stem 54 which receives the rod 42, and a counterbore 56 which receives a C-washer 58 seated in a groove in the rod. Near its upper end the rod has a groove which receives a C-washer 60 bearing against the end of stem 54 and retained by a cap 61 slid down over the end of the rod and retained by a snap ring 62. This positively secures the piston rigidly to the rod. The piston may be sealed to the cylinder wall by any suitable O-ring 64 and sealed to the rod by an O-ring 65. The spring 48 constantly holds the bonnet 50 against a snap ring 66 which holds the entire assembly together.

The chuck and tire collectively form a container into which air under pressure for inflating the tire is admitted by a fail-safe valve now to be described. This is so called because if anything fails, the valve maintains a safe status by preventing inflation. For example, if anything goes wrong with the valve such as leaking, or wearing out or blowing out of the O-ring, or anything which would prevent sufficient inflation pressure, or if the dogs are not in locking position, the valve will not permit the tire to be inflated. The bonnet has a bore including a cylindrical portion 74 of relatively small diameter which snugly fits the rod 42, and a portion of relatively large diameter such as a counter bore or preferably a conical portion 75. The upper end of the rod 42 and the bore 74 together form a valve which selectively vents the container and the bore 74 to the atmosphere through vent passages 78, or prevents communication with the vent passages so that the container can be filled with air under pressure. When the end of the rod 42 is in the cylindrical part 74 as shown in FIG. 1 communication is prevented between the bore of the rod and the vent passages. Then air admitted to the bonnet by supply pipe 76 passes through the rod and fills the container as above described to inflate the tire.

When the rod is lowered to unlock the dogs the upper end of the rod is lowered out of the cylindrical part of the bore and into or thru the conical part to the position shown in FIG. 2. Then any air entering through the pipe 76, if this is possible, blows out past the end of the rod and out into the atmosphere by exhaust conduits 78 adjacent the rod and communicating with the conical part of the bore. The effectiveness of the seal between the upper end of the rod 42 and the bore 74 can be increased by any known seal, such as the O-ring 70. The conical part of the bore forms a guide for the O-ring into the cylindrical bore 74 when the locking rod is raised and its end is pushed into the cylindrical part.

Thus the operating rod 42 has valve means formed on or carried by its upper end, which in cooperation with the bore 74 forms the fail-safe valve referred to. This valve is responsive to the position of the locks 36 for permitting or preventing pressurizing of the tire. When the dogs are safely locked, the valve interrupts communication between the exhaust or vent passages 78 and the bore 74 or inlet 76 which is always open to the container. Therefore the tire can be inflated. However if the dogs are unlocked, the valve permits communication between the air inlet and the exhaust so if by any malfunction, the controls admit air into the inlet, the air simply blows out the vents and the tire cannot be inflated. In fact, if there is any condition which would prevent proper inflation of the tire the valve establishes communication between the inlet and the vents to prevent pressure being admitted to the tire.

The tire is deflated by shutting off the supply and venting the space within the tire to atmosphere. Thereafter the air pressure is released in the locking passage 47 and this is vented. This lets the spring 48 push the piston down to move the dogs 36 to unlocked position. It is intended that the above described control of pressure and venting is to be done by any suitable manual or automatic controls, not shown.

It is important to prevent the dogs from being unlocked until the tire has been substantially completely relieved of pressure. This is because the force urging the chuck halves apart can be very large even when the pressure in the tire is low, because the effective pneumatic area of the chuck and tire is large. For example with a 7:00 by 14" tire, air pressure of only half a pound per square inch will produce a force of the order 300 pounds urging the chuck halves apart. If the chuck could be released under this force, serious damage could result.

The arrangement of the locking dogs 36 and spring 48 prevents this. It will be seen from the positions of the locking dogs in FIGS. 1 and 2 that as the dogs pivot toward unlocked position, the corners 80 necessarily move closer to the chuck half 10 than they are when in fully locked position. In order for the dogs to be rotated toward the unlocked position at all these corners must move the lower half of the chuck toward the upper half against whatever pressure there is in the tire. The lengths or lever arms of the dog on both sides of the pivot may be so proportioned and related to the force of the spring 48 that the spring cannot unlock the dogs until the tire pressure is substantially zero. For example, suppose the spring can exert on the piston a force of 40 pounds and the ratio of the lengths on opposite sides of the pivots is 3. Then the force required to hold the lower chuck halves against the dogs locking position would be 120 pounds neglecting friction. If the tire and chuck weigh 100 pounds only 20 pounds total force due to the tire pressure would be required. This would mean that in a typical passenger car tire, a pressure of the order of an ounce or two per square inch could prevent moving the the dogs to unlocked position. This can do no harm should the tire chuck be released while the tire contains such negligible pressure.

Figure 3:
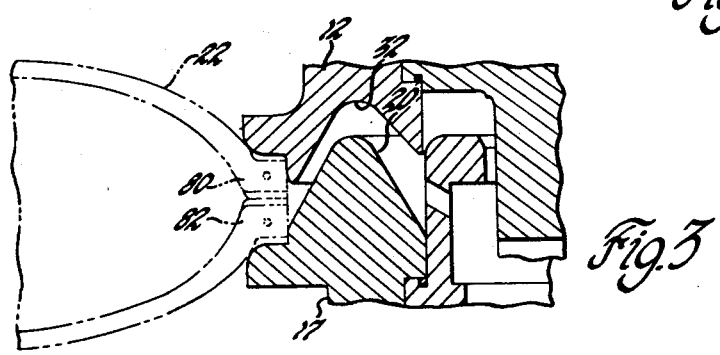
FIG. 3 is a schematic partial cross section of a tire showing the beads in their position of initial contact.
Figure 4:
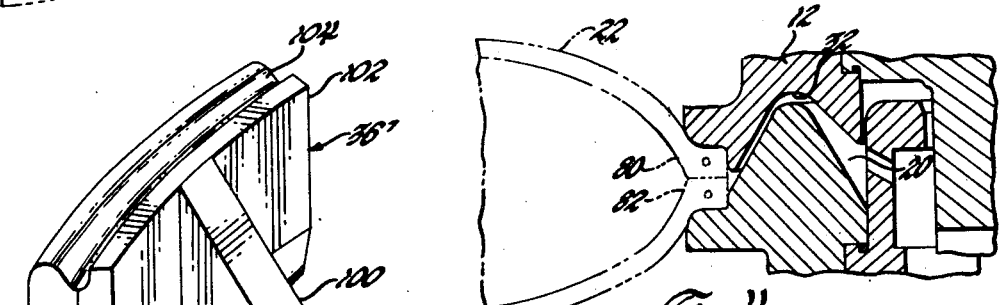
FIG. 4 is a cross section similar to FIG. 3 showing the beads flattened against the rims to form sealing contacts.

Referring to FIGS. 3 and 4, when the tire is to be inflated, it is important that the two beads 80 and 82 form a pressure-tight seal with the tire rings 12 and 17. It is not sufficient for the beads merely to be in contact as in FIG. 3, because air can leak between the beads and the rings and prevent establishment of the proper pressure in the tire. This happens more often when the beads are warped and do not make contact all around with the flanges 84 of the rings. To straighten any warped beads and to insure sealing, I so proportion the guide surfaces 20 and 32 and so arrange the support of the stud 18 which lifts the lower chuck member that when the lower chuck half is fully raised, the beads are not only straightened but are pressed against the rims firmly enough to provide an effective seal. Sufficient force is supplied to flatten even badly warped beads against the plane surfaces of the flanges and to hold them against the flanges to effect a pressure-tight seal.

Of course the two beads are held together against each other with the same force. I have found, surprisingly, that this does not interfere with air passing between the beads to inflate the tire when pressures, for example, of 80 pounds per square inch or more are used. This seems to be made possible by irregularities in the bead surfaces or corners, so that very soon air in small streams can force the beads apart along thin lines to provide narrow channels into the tire, while the force of the pressure over the whole area of the beads against the flanges preserves the sealing contact between the flanges and the beads. Soon the pressure in the chuck separates the beads and the chuck halves as far as the locks permit, but I have found that by the time the beads begin to separate the pressure of the air inside the tire has become high enough to maintain the seal between the beads and the flanges, as it does in a tubeless tire in service on a wheel.

In FIG. 1 the stud 18 represents means for urging the chuck halves toward each other enough to seal the beads as above described.

Figure 5:
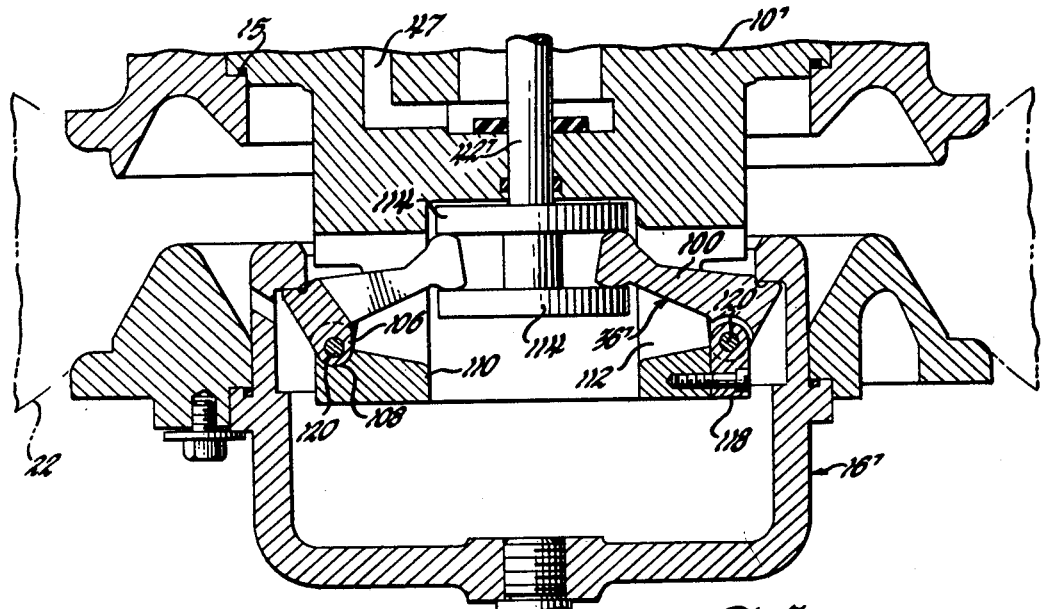
FIG. 5 is part of a section corresponding to FIG. 1, showing a modified form of locking means in locked position.
Figure 6:
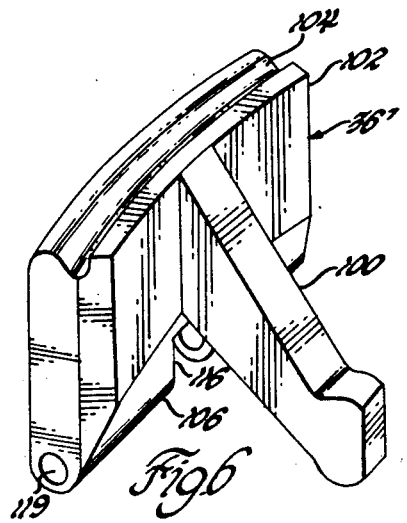
FIG. 6 is a perspective view of one of the locks.

The invention can be applied to the alternative form of chuck and locking device shown in FIGS. 5 and 6. In this the bodies 10′ and 16′ of the chuck halves are substantially like the corresponding bodies in FIG. 1, but are modified as to dimension, strength and particular form of the locking surfaces and supports for the locking dogs. The dogs 36′ are formed with a stem 100 and a broad locking head 102 which extends for a substantial distance around the rim of the chuck, so that all the heads collectively extend substantially around the entire rim. On its upper surface each head has a substantially flat locking surface 104 which is in the form of a sector of an annulus and has on its lower surface a long cylindrical convex bearing surface 106 which is received and supported entirely in a corresponding long cylindrical concave bearing surface 108 formed in a cylindrical wall 110 integral with the body 10′. The body 10′ has openings 112 for the stems 100 which are rotated about the center lines of the surfaces 108 by flanges 114 on the lock operating stem 42′. This arrangement provides pivot bearings capable of sustaining greater loads than can be carried by the pins 37 in FIG. 1 and makes the device suitable for large tires and high inflating pressures. It also loads the locks substantially entirely in compression, which is of advantage.

In order to retain the locks assembled with the chuck, each lock may have a slot 116 which receives a perforated support 118 attached to the wall 110, and a bore 119 for receiving a pin 120 passing through the support 118. The pin, slot, and support have a loose fit that imposes no load on the pin or support and does not interfere with the pivoting of the lock on the bearing surfaces.

Having thus described the invention, what is claimed as new is as follows:

1. A tire inflating device comprising in combination, a pair of separable tire chuck members each having a ring for supporting one bead of a tire, said chuck members when coaxial and adjacent each other forming a support for inflating a tire, the chuck members together with tire when supported thereon forming a container for air under pressure, locking means to prevent the separation of the chuck members more than a predetermined distance when the tire is inflated, operating means to lock and unlock the locking means, means for conducting air under pressure into the container, and valve means carried by the operating means for preventing the establishment fo pressure in the container, said valve means being positioned by the operating means to prevent the establishment of pressure when the locking means is unlocked and being positioned to permit the establishment of pressure in the container when the locking means is locked.

2. A tire inflating device comprising a combination of a pair of separable chuck members each having a ring for supporting one bead of a tire, said chuck members when coaxial and adjacent each other forming a support for inflating a tire, the chuck members together with a tire when supported thereon forming a container for air under pressure, locking means to prevent separation of the chuck members more than a predetermined distance when the tire is inflated, operating means to lock and unlock the locking means, means for conducting air under pressure into the container, a vent passage for connecting the interior of the container to the atmosphere, and vent valve means cooperating with the vent passage and carried by the operating means, said valve means being placed by the operating means to prevent the establishment of pressure when the locking means is unlocked and being placed to permit establishment of pressure when the locking means is locked.

3. A tire inflating device comprising in combination, a pair of separable chuck members each having a ring for supporting one bead of a tire, said chuck members when coaxial and adjacent each other forming a support for inflating a tire, the chuck members together with the tire when supported thereon forming a container for air under pressure, locking means to prevent separation of the chuck members more than a predetermined distance when the tire is inflated, operating means to lock and unlock the locking means, a first passage in continuous fluid communication with the container, a vent passage for conducting air from the container, and means responsive to the position of the operating means for closing the vent passage when the locking means is locked and for opening the vent passage when the locking means is unlocked.

4. A tire inflating device comprising in combination a pair of separable tire chuck members each having a ring for supporting one bead of a tire, said chuck members when coaxial and adjacent each other forming a support for inflating a tire, the chuck members together with a tire when supported thereon forming a container for air under pressure, locking means to prevent separation of the chuck members more than a predetermined distance when the tire is inflated, an operator attached to one of the chuck members to lock and unlock the locking means, an inlet passage for supplying air under pressure to said one of the chuck members for conduction into the container, and an exhaust passage adapted to communicate with the inlet passage, the operator including means which, when the operator is in locking position, prevents communication between the inlet passage and the exhaust passage so as to maintain air under pressure in the container and which, when the operator is in unlocking position, establishes communication between the inlet and exhaust passages to prevent establishment of pressure in the container.

5. A tire inflating device comprising in combination a pair of separable chuck members each having a ring for supporting one bead of a tire, said chuck members when coaxial and adjacent each other forming a support for inflating a tire, the chuck members together with a tire when supported thereon forming a container for air under pressure, locking means to prevent separation of the chuck members more than a predetermined distance when the tire is inflated, means having a cylindrical bore attached to one of the chuck members, a reciprocating hollow stem in said one of the chuck members to lock and unlock the locking means, said stem being movable into the bore to lock the locking means and being movable out of the bore to unlock the locking means, an inlet passage for supplying air under pressure to the bore for conduction through the stem into the container, and an exhaust passage adapted to communicate with the bore, the stem including means, which when the stem is in the bore fits the bore and prevents communication between the bore and the exhaust passage so as to maintain air under pressure in the container and which when the stem is in unlocking position establishes communication between the inlet and the exhaust passages to prevent establishment of pressure in the container.

6. A tire inflating device comprising in combination a pair of separable tire chuck members each having a ring for supporting one bead of a tire, said chuck members when coaxial and adjacent each other forming a support for inflating a tire, the chuck members together with a tire supported thereon forming a container for air under pressure, locking means to prevent separation of the chuck members more than a predetermined distance when the tire is inflated, means having a bore attached to one of the chuck members, a hollow stem movable into the bore to lock and unlock the locking means, means for supplying air under pressure to the bore for conduction through the stem into the container, and an exhaust passage for conducting air from the bore, the stem having valve means thereon cooperable with the bore for permitting or preventing communication between the air supply means and the exhaust passage, said valve means being in the permitting position when the locking means is unlocked.

7. An inflation device for tires comprising in combination a pair of separable chuck members each having a ring for supporting one bead of a tire, the chuck members when coaxial and adjacent each other forming a support for inflating a tire, the chuck members together with a tire when supported thereon forming a container for air under pressure, locking means to prevent separation of the chuck members more than a predetermined distance when the tire is inflated, a bore in one of the chuck members having a portion of relatively large diameter and a portion of relatively small diameter, a hollow stem movable into the bore to lock and unlock the locking means, means for supplying air under pressure to the bore for conduction thru the stem into the container, and an exhaust passage communicating with the part of the bore of larger diameter, the stem including sealing means for cooperating with the bore for permitting or preventing communication between the large diameter portion of the bore and the small diameter portion, said sealing means forming a sealing contact between the stem and the small portion of the bore when the stem is in position to lock the locking means and being positioned in the large diameter part of the bore to permit communication between the two parts of the bore when the stem is in position to unlock the locking means.

8. A tire inflating device comprising in combination, a pair of separable tire chuck members each having a ring for supporting one bead of a tire, said chuck members when coaxial and adjacent each other forming a support for inflating a tire, the chuck members together with a tire when supported thereon forming a container for air under pressure, locking means to prevent separation of the chuck members more than a predetermined distance when the tire is inflated, operating means to lock and unlock the locking means, a passage for supplying air under pressure to the container, a vent passage adapted to communicate with the supply passage, and means responsive to the position of the operating means for permitting or preventing communication between the supply passage and the vent passage.

9. A tire inflating device comprising in combination a pair of separable tire chuck members each having a ring for supporting one bead of a tire, said chuck members when coaxial and adjacent each other forming a support for inflating a tire, the chuck members together with a tire when supported thereon forming a container for air under pressure, a plurality of locks pivoted to one chuck member which locks in one position permit separation of the chuck members and when in another position engage the other chuck member to prevent positively separation of the chuck members when the tire is inflated, means attached to said one chuck member having a bore therein, a hollow rod reciprocable in said bore, said rod being mechanically connected to said locks and adapted to hold the locks selectively in either of said positions, a fluid pressure inlet for said bore, said device having a permanent fluid communication between said bore and the container through said hollow rod, a vent passage communicating with the bore, said rod including means for preventing communication between the bore and the vent passage to permit inflation of the tire when the locks are in locking position.

10. A tire inflating device comprising in combination, a pair of separable tire chuck members each having a ring for supporting one compressible bead of a tire, said chuck members when coaxially held adjacent each other forming a support for inflating a tire, the chuck members together with tire when supported thereon forming a container for air under pressure, locking means to prevent the separation of the chuck members more than a predetermined distance when inflated, operating means to lock and unlock the locking means, means for supporting pressure to the container, valve means carried by the operating means for cooperating with the supply means to prevent the establishment of pressure in the container, said valve means being positioned by the operating means to prevent the establishment of pressure when the locking means is unlocked and being positioned to permit the establishment of pressure in the container when the locking means is locked, force receiving means for moving the chuck members toward each other sufficiently to flatten and press the beads firmly against each other, and means for supplying air under pressure to the tire between the beads.

References Cited in the file of this patent

UNITED STATES PATENTS

| | | |
|---|---|---|
| 1,284,079 | Feuser | Nov. 5, 1918 |
| 1,947,258 | Gay | Feb. 13, 1934 |
| 2,133,438 | Eger | Oct. 18, 1938 |
| 2,340,264 | Freeman | Jan. 25, 1944 |
| 2,493,289 | Hawkinson | Jan. 3, 1950 |
| 2,695,520 | Karsai | Nov. 30, 1954 |
| 2,741,799 | Heston | Apr. 17, 1956 |
| 2,866,500 | George et al. | Dec. 30, 1958 |
| 2,888,065 | Neilsen | May 26, 1959 |
| 3,042,091 | Dunton | July 3, 1962 |

FOREIGN PATENTS

| | | |
|---|---|---|
| 890,906 | France | Feb. 22, 1944 |

UNITED STATES PATENT OFFICE
CERTIFICATE OF CORRECTION

Patent No. 3,128,807 April 14, 1964

Woodson B. Kilgore

It is hereby certified that error appears in the above numbered patent requiring correction and that the said Letters Patent should read as corrected below.

Column 2, line 29, for "end" read -- and --; column 8, lines 25 and 26, for "supporting" read -- supplying --.

Signed and sealed this 18th day of August 1964.

(SEAL)
Attest:

ERNEST W. SWIDER
Attesting Officer

EDWARD J. BRENNER
Commissioner of Patents